United States Patent [19]

Spruijt

[11] 3,915,083

[45] Oct. 28, 1975

[54] APPARATUS FOR AUTOMATICALLY PROCESSING BULBOUS AND TUBEROUS PLANTS

[75] Inventor: Hendrik Spruijt, Emmeloord, Netherlands

[73] Assignee: Mattijs Pieter Vogelaar, Zoetermeer, Netherlands

[22] Filed: Sept. 20, 1973

[21] Appl. No.: 399,001

[30]   Foreign Application Priority Data
    Sept. 21, 1972  Netherlands....................... 7212752
    Mar. 29, 1973  Netherlands....................... 7304354

[52] U.S. Cl. ...................... 99/636; 99/643; 198/247
[51] Int. Cl.².......................................... A23N 15/04
[58] Field of Search ............ 99/546, 635, 636, 637,
    99/643; 56/121.4, 121.41, 121.42, 121.43,
    99/121.44, 121.45, 121.46; 171/31–38, 42;
    198/246, 247

[56]         References Cited
        UNITED STATES PATENTS
2,961,023  11/1960  Boyer.................................... 99/636

3,164,182  1/1965  Hughes............................ 99/643 X
3,765,320  10/1973  vanRaay............................... 99/636

FOREIGN PATENTS OR APPLICATIONS
1,043,730  9/1966  United Kingdom................... 99/636

*Primary Examiner*—Peter Feldman
*Assistant Examiner*—Alan Cantor
*Attorney, Agent, or Firm*—Pollock, Philpitt & Vande Sande

[57]          ABSTRACT

An apparatus for automatically processing bulbous and tuberous plants, wherein the bulbs or tubers are passed from a vibrating supply trough through a supply and dosing device including a blade wheel and a brush to a tapered chute terminating in a V-shaped chute. The bulbs or tubers attain a rolling movement wherein the main axis is substantially horizontal and are gripped by a conveyor rope located above the end of the V-shaped chute. Under the pressure of the conveyor rope the bulbs or tubers are passed through a notching and/or cutting device.

17 Claims, 11 Drawing Figures

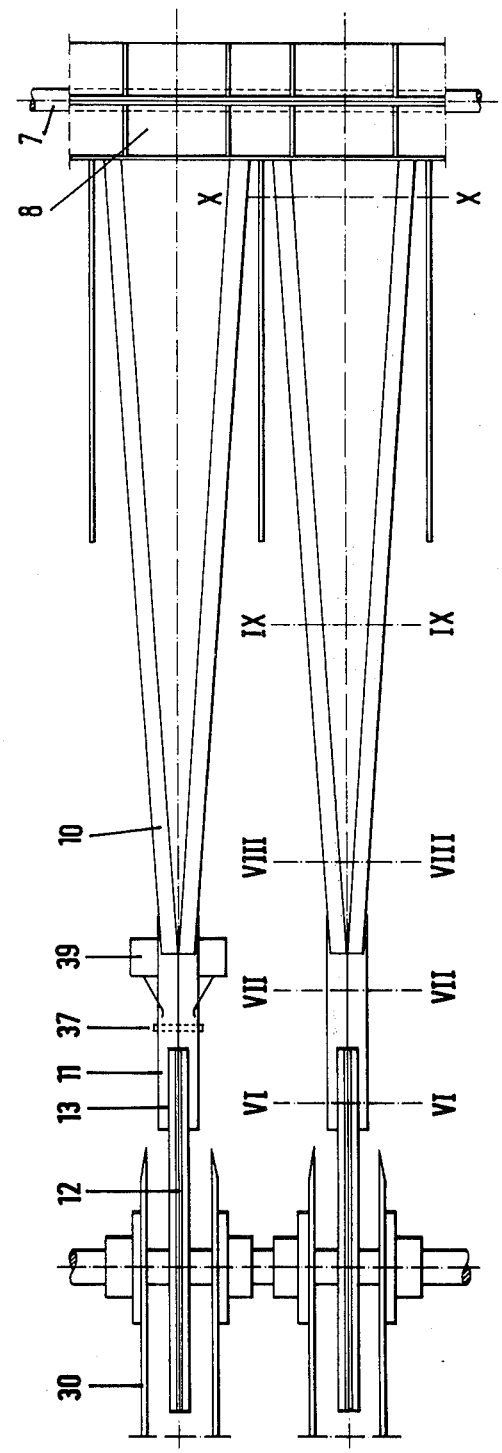

APPARATUS FOR AUTOMATICALLY PROCESSING BULBOUS AND TUBEROUS PLANTS

The present invention relates to an apparatus for automatically processing bulbous and tuberous plants.

Hereinafter when the "top" of a bulb or tuber is mentioned, it will be understood that reference is being made to the end carrying the roots and the "tail" end refer to the opposite end.

Hitherto the topping, tailing and skinning of, for example, onions has always required a number of manual operations. For example, in one prior apparatus, the onions are to be manually disposed in V-shaped recesses, whereafter the tops and tails are mechanically cut off by blades.

In another prior apparatus, the tails of the bulbs are pinched off by two oppositely rotating rollers, one of which has a helical groove. In this prior apparatus, the roots are not removed, because there is a great chance of bulb damage.

In yet another prior apparatus, onions are wet-skinned which, however, results in a damaged final product as the cells of the flesh at the surface are ruptured and, consequently, the preservation of the final product presents a problem.

It is a an object of the present invention to provide an apparatus which does not entail the above drawbacks and which is able to top and tail the bulbs or tubers and, if bulbs are concerned, to prepare the bulbs for a skinning operation. It is a further object of the present invention to provide an apparatus having a high output capacity.

To this end, an apparatus for automatically processing bulbous or tuberous plants according to the present invention is characterized by a supply and dosing device, a downwardly sloping feed chute contiguous therewith and terminating in a V-shaped chute such that the bulbs or tubers attain a rolling movement due to their specific shape and the sloping position of the feed chute, the main axis of a bulb or tuber extending from top to tail attaining a substantially horizontal position, the V-shaped chute being dimensioned such that the tops and tails of the bulbs or tubers extend on either side of the V-shaped chute, and by a cutting and notching device contiguous with the V-shaped chute for cutting off the tops and tails of the bulbs and tubers and providing a circular notch in the bulbs.

The present invention will be described in detail hereinafter with reference to the accompanying drawing wherein.

Figure 1:
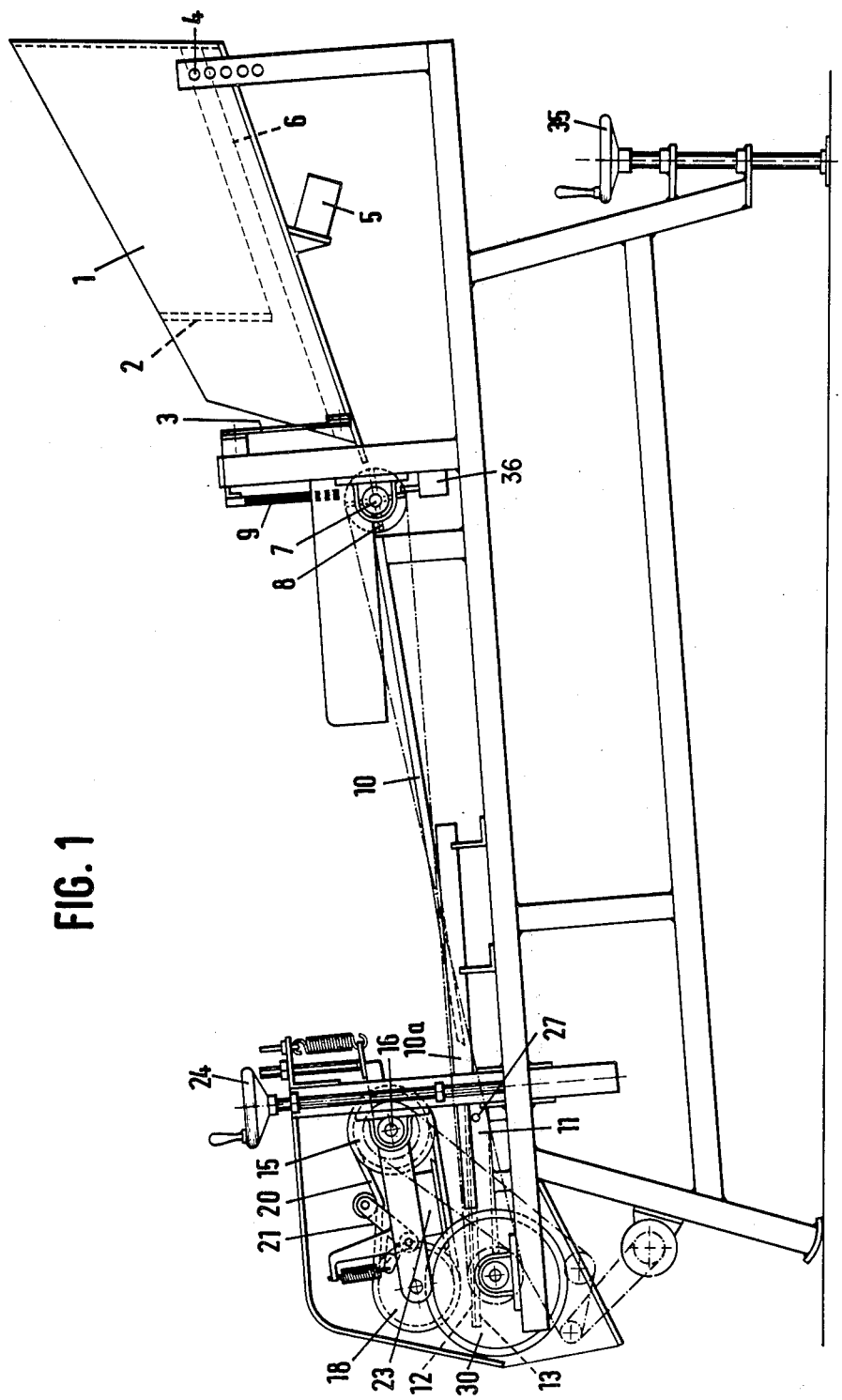
FIG. 1 shows a side view of the apparatus according to the present invention.
Figure 4:
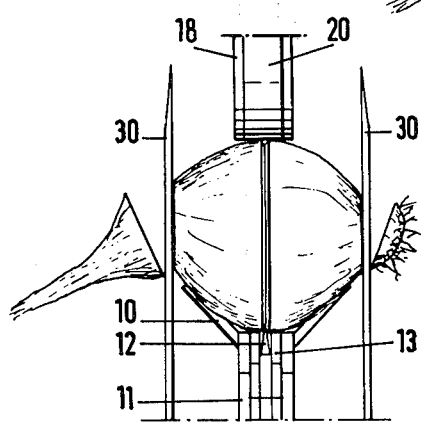
Figure 4A:
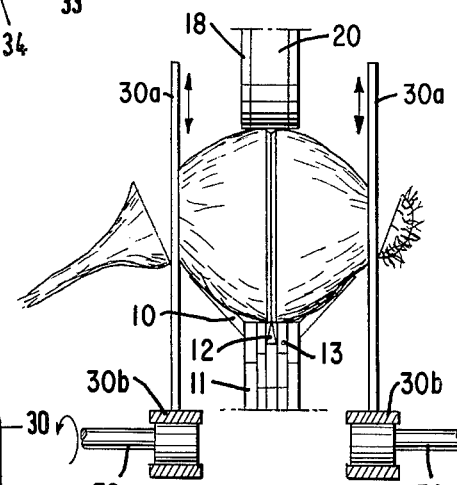
Figure 3:
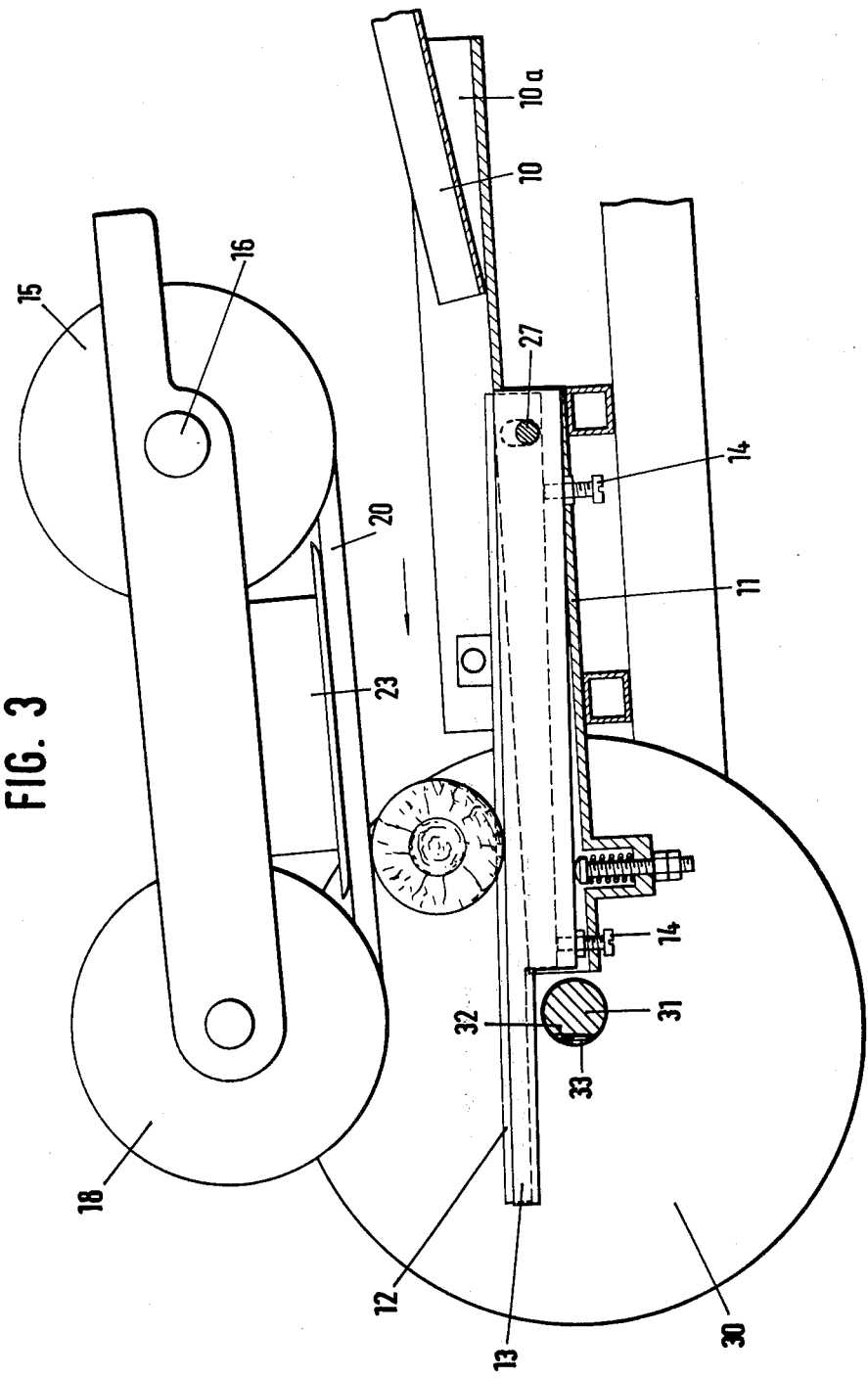
FIG. 3 shows a longitudinal section of the notching device and a pressure means associated therewith.

FIG. 4 schematically shows the operation of the cutting and notching device shown in FIG. 3;

FIG. 4A discloses an alternative embodiment of the invention;

FIG. 5 shows a top view of a twin-arrangement of two apparatuses according to the present invention;

FIGS. 6 through 10 show a number of cross-sections of a feed chute and a V-shaped chute included in the apparatus shown in FIG. 1 taken at different places.

In FIG. 1 the products to be processed (e.g. onions) are dumped from a conveyor belt (not shown) into a trough, 1, which may include partitions 2. At the end where the onions are supplied by the conveyor belt the trough is spring-mounted in vertically adjustable fashion in supports 4, while at the opposite end the trough is suspended from leaf springs 3. The slope of the trough can be adjusted by displacing the supports 4. Due to its flexible suspension, the trough can be made to vibrate by means of a vibrator 5 so as to realize an even supply. In dependence upon the number of cutting and notching devices to be used, the trough may include a number of guide means 6. The chutes formed thereby promote a proper supply to the part of the apparatus to be described hereinafter.

At the output end of the trough 1 there is mounted a blade wheel 8 driven by a motor. In FIG. 1 the direction of rotation is counter-clockwise. The onions arriving at the end of the trough drop between the blades of the blade wheel. A brush 9 mounted above the blade wheel ensures that only one onion is present between two successive blades of the blade wheel so that only one onion at a time is supplied to the feed chute 10. The speed of the motor driving the blade wheel is adjustable to permit optional control of the supply speed.

The feed chute 10 has a downward slope and a tapered cross-section terminating in a V-shaped chute 10a (FIGS. 6 through 10).

Experiments have shown that bulbs or tubers reaching the feed chute 10 will attain a rolling movement due to their specific shape and the sloping position of the chute, the main axis of a bulb or tuber, i.e., the axis extending from top to tail, attaining a substantially horizontal position.

Upon reaching the place where the feed chute 10 terminates in the V-shaped chute 10a, the bulbs or tubers (in the present case the onions) will roll on with their tops and tails extending on either side of the V-shaped chute (FIG. 4).

The surfaces of the feed chute 10 and the V-shaped chute 10a may be roughened, for example by means of carborundum, to prevent slippage of the onions. The feed chute 10 may be composed of a series of shorter but for the rest similar chutes, the tapered end of each chute terminating in a wide portion of the next chute. In such an arrangement the bulbs or tubers will more readily attain the proper rolling position due to the fact that a correction of the position of the main axis occurs at the tapered end of each chute.

Figure 2:
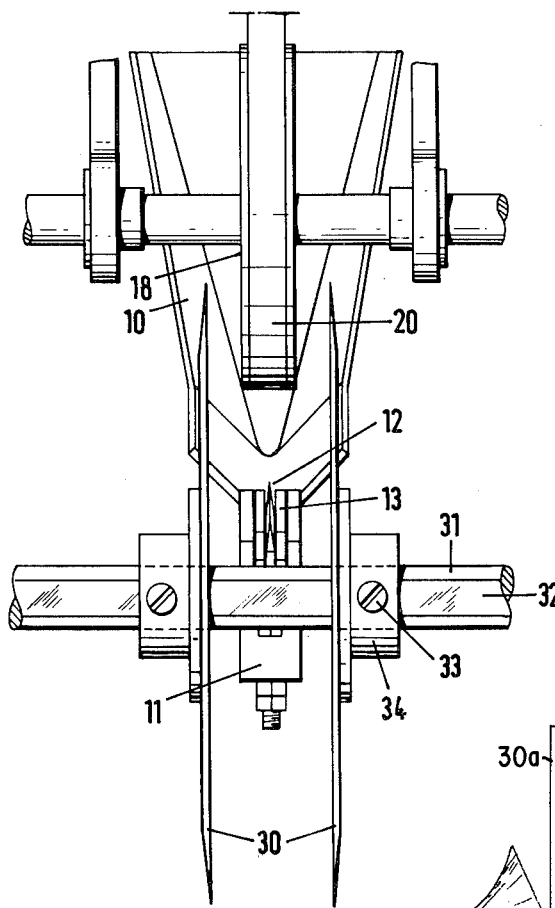
FIG. 2 shows a front view of a cutting and notching device included in the apparatus shown in FIG. 1.

As shown in FIGS. 2 and 3, the V-shaped chute 10a is contiguous with a blade holder 11 extending partly in the bottom of the V-shaped chute 10a and partly beyond this chute in the direction of movement. In the blade holder 11 there is vertically mounted a notching blade 12 contained in a cutting depth limiter 13. The desired height of the blade 12 relative to the cutting depth limiter 13 can be adjusted by means of adjusting screws 14 so as to determine the notching depth and to prevent the blade from cutting too deeply into the product to be processed.

When tubers, which generally do not have to be notched, are processed, the blade may be removed or fully withdrawn in the cutting depth limiter.

A pressure means (FIGS. 1 and 3) including two pulleys and a conveyor rope 20 engaging the pulleys is mounted above the blade holder 11. The first pulley 15 is mounted on a driven shaft 16 and is located above the beginning of the blade holder 11. The pulley 15 is rotated clockwise in FIG. 1 such that the active part of the conveyor rope 20 facing the blade holder 11 travels from right to left. The spacing between the pulley 15 and the cutting depth limiter 13 or the V-shaped chute 10a is more than the greatest possible thickness of the products to be processed.

The second pulley 18 is spring-mounted above the end of the cutting depth limiter 13. The spacing between the second pulley 18 and the cutting depth limiter 13 is less than the smallest possible thickness of the onions to be processed. Thus a wedge-shaped space is provided between the cutting depth limiter 13 and the active part of the conveyor rope 20. A tensioning arrangement 21 is provided for tensioning the conveyor rope 20. In the embodiment shown in the drawing, the height of the shaft 16 is adjustable by means of a screwed spindle adjusting mechanism 24. A pressure block 23 is mounted at the back of the active part of the conveyor rope 20 to prevent the rope 20 from being depressed by the products to be processed.

The product fed through the feed chute 10 and the V-shaped chute 10a is gripped and advanced by the rope 20, whose active part facing the notching blade moves in the direction of travel of the bulbs or tubers. As the pressure means has a sloping position relative to the notching blade 12, the product is firmly urged against the notching blade and the cutting depth limiter 13 and will maintain its rolling movement (see FIG. 3). As a result thereof, a circular notch in the product is obtained normal to the main axis, so that the skin halves remaining after topping and tailing, which will be described hereinafter, can be removed in a simple manner. The notching blade 12 and the cutting depth limiter 13 are springmounted in the blade holder 11, so that the blade can follow irregularities in the shape of the product to be processed.

Substantially concurrently with the notching, the product passes two blades 30 mounted on either side of the notching blade, which blades 30 cut off the top and tail. These blades may be circular and rotated in vertical planes parallel with the direction of travel by means of a shaft extending through the centres of the blades. In a preferred embodiment, however, such blades are eccentrically mounted on the shaft to obtain an improved cutting action. It is also possible to use elongated blades being an oscillatory motion as in FIG. 4A or rotating about a shaft. In FIG. 4A, the elongated blades 30a are provided with an oscillation motion by eccentrically mounted rollers 30b each rotating about a shaft 30c.

The blades 30 of the embodiment shown in the drawing are circular and include flanges 34 (FIG. 2). A screwed hole is provided in the flange 34 normal to the shaft so that the flange and, consequently, the blade can be secured to the shaft 31 by a screw 33. To this end the shaft 31 has a flat face 32 and the shaft hole in the flange 34 has a corresponding flat face. When the screws 33 are released, the blades can be displaced on the shaft 31 to adjust the desired spacing between the blades. Different securing and guiding arrangement are possible, such as an arrangement using a key and a keyway.

After the bulbs or tubers have passed through the notching and/or cutting device, the now loose skin halves can be removed in a manner known per se by brushes or by means of compressed air.

The apparatus according to the present invention may further comprise means permitting further automation of the processing procedure. These means will be described hereinafter.

When a bulb or tuber fails to roll properly, for example due to a deviating shape, and comes to a stop in the feed chute 10 or the V-shaped chute 10a, obstruction of the chute in question may occur. To prevent such obstruction, the blade wheel 8 is mounted on the shaft 7 by means of a friction coupling. The blade wheel can be blocked by a pawl mechanism 36 (FIG. 1). An onion rolling through the feed chute 10 and the V-shaped chute 10a passes a contact maker 37 (FIG. 3) which may be a photoelectric device or a mechanical contact maker. Upon passage of the contact maker 37 (FIG. 5) a current circuit is closed and the pawl mechanism can be unblocked, for example by means of an electromagnet, so as to permit the blade wheel 8 to rotate and supply the next onion. By means of delay circuitry (not shown) the pawl mechanism remains in the unblocked state until the next blade of the blade wheel has approached the supply position. The delay circuitry will maintain the pawl mechanism in the unblocked state permitting rotation of the blade wheel 8 only when the contact maker 37 has applied a signal to the delay circuitry in response to the passage of the preceding onion. An alarm device (not shown) may be coupled with the blade wheel 8 or the pawl mechanism in a known per se manner for producing an alarm signal when the blade wheel remains in the blocked state.

For automatically adjusting the spacing between the cutting means 30, use may be made of sensors 39 (FIG. 5) disposed as close as possible to the blades 30 on either side of the V-shaped chute for sensing the width of a passing onion. The sensors 39 may be inwardly extending strips and cause the blades 30 to be displaced on the shaft 31 either mechanically by means of a lever system (not shown), or electrically, for example by means of potentiometers, a bridge circuit and a servo mechanism (not shown). The displacement of the blades 30 on the shaft may be realized as a key slot provided in the flanges slides on a key provided in the shaft (not shown).

Finally it is observed that the sloping position of the entire apparatus may be adjusted by means of a screwed spindle adjusting mechanism 35 (see FIG. 1) to obtain an optimal rolling effect in the feed chute 10 and the V-shaped chute 10a.

By means of a prototype comprising 12 apparatuses according to the present invention mounted on a common frame an output capacity of 12 onions per second, i.e. 2.5 tons per hour, was achieved.

The apparatus described above permits various modifications without exceeding the scope of the present invention.

I claim:

1. Apparatus for automatically processing bulbous or tuberous plants of the type having oppositely extending top and tail portions comprising:

a downwardly sloping feed chute, a further chute of converging V-shaped cross section so dimensioned in relation to the bulbs or tuberous plants being processed that the tops and tails thereof extend outwardly beyond either side respectively of said further chute, and processing means adjacent the downstream end of said further chute, whereby each said bulb or tuberous plant attains a rolling movement as it moves downwardly along said further chute to facilitate its processing by said processing means.

2. The apparatus of claim 1 wherein said processing means includes a cutting device for cutting off the tops and tails of said bulbs or tuberous plants.

3. The apparatus of claim 2 wherein said processing means includes a notching device for notching a peripheral notch in each bulb or tuberous plant.

4. An apparatus according to claim 3, characterized in that the notching device comprises a vertically mounted notching means extending vertically upward and partially into the bottom of said V-shaped chute, and that said cutting device comprises two cutting means vertically mounted on either side of the notching means.

5. An apparatus according to claim 4, characterized in that the spacing between the cutting means is variable to achieve an optimal adaptation to the dimensions of the bulbs or tubers to be processed.

6. An apparatus according to claim 5, characterized by sensing means adjacent the end of the V-shaped chute for sensing the size of the bulbs or tubers to be processed, and a control means associated with the sensing means for controlling the spacing between the cutting means to adapt the spacing to the dimensions of the bulbs or tubers to be processed.

7. An apparatus according to claim 4, characterized in that the notching device comprises means for controlling the depth of the peripheral notch.

8. An apparatus according to claim 7, which further includes means for adjusting the height of the notching means relative to said means for controlling the depth of cut to achieve a desired depth of the notch.

9. An apparatus according to claim 4, characterized by each said cutting means rotating in a vertical plane.

10. An apparatus according to claim 9, characterized by substantially circular cutting means rotating eccentrically about a drive shaft.

11. An apparatus according to claim 4, characterized by elongated cutting means oscillating in a vertical plane.

12. An apparatus according to claim 1, characterized by a pressure means for the bulbs or tubers to be processed comprising, two pulleys interconnected by a conveyor rope, the first pulley being mounted above the beginning of the V-shaped chute with a spacing more than the greatest expected thickness of the bulbs or tubers, and the second pulley being spring-mounted above the end of the notching means, the spacing between the second pulley and the notching means in the rest position being less than the smallest expected thickness of the bulbs or tubers, the direction of rotation of the pulleys being such that the bulbs or tubers are passed in rolling fashion over the notching means under the pressure of the conveyor rope.

13. An apparatus according to claim 12, characterized by a pressure block mounted at the back of the conveyor rope preventing depression of the rope.

14. An apparatus according to claim 1, which further comprises a blade wheel positioned adjacent the upstream end of said feed chute and normally blocking passage of said bulbs or tuberous plants to said feed chute, and a pawl mechanism for at times actuating said blade wheel for permitting entry of a bulbous or tuberous plant to said feed chute, the pawl mechanism being controlled by a detector mounted adjacent the end of the V-shaped chute for releasing the blade wheel for rotation each time the preceding bulb or tuber has passed the detector.

15. An apparatus according to claim 1, characterized in that the feed chute comprises a series of tapered chutes, the narrow end of each chute terminating in a wide portion of the next chute.

16. The apparatus of claim 1 which further includes means upstream of said feed chute comprising, a plurality of axially spaced blades rotating about a horizontal axis normal to the axis of said feed chute and having a spacing which accepts only a single bulb or tuberous plant between each pair of blades, and also a brush means disposed above said blades for permitting only a single such bulb or tuberous plant at a time to enter the space between successive of said blades.

17. An apparatus according to claim 16, characterized in that the surfaces of the feed chute and the V-shaped chute are roughened to prevent slippage of the bulbs or tubers.

* * * * *